(12) United States Patent
Abughaida et al.

(10) Patent No.: US 12,522,123 B2
(45) Date of Patent: Jan. 13, 2026

(54) AUTOMATED TRAILER LOADING SYSTEM FOR BOATS

(71) Applicant: Honda Motor Co., Ltd., Tokyo (JP)

(72) Inventors: Amer Abughaida, Ann Arbor, MI (US);
Yasir Al-Nadawi, Ann Arbor, MI (US);
Sangjae Bae, San Jose, CA (US);
Samir K. Al-Stouhi, Dearborn, MI (US)

(73) Assignee: Honda Motor Co., Ltd., Tokyo (JP)

( * ) Notice: Subject to any disclaimer, the term of this patent is extended or adjusted under 35 U.S.C. 154(b) by 199 days.

(21) Appl. No.: 18/362,025

(22) Filed: Jul. 31, 2023

(65) Prior Publication Data

US 2025/0042323 A1   Feb. 6, 2025

(51) Int. Cl.
B60P 3/10   (2006.01)
B63H 25/04   (2006.01)

(52) U.S. Cl.
CPC ............ B60P 3/1075 (2013.01); *B63H 25/04* (2013.01)

(58) Field of Classification Search
CPC ..... B60P 3/1075; B60P 3/1033; B60P 3/1066; B63H 25/04; B63C 3/12
See application file for complete search history.

(56) References Cited

U.S. PATENT DOCUMENTS

| | | |
|---|---|---|
| 5,544,611 A | 8/1996 | Fahringer, Sr. et al. |
| 6,707,414 B2 | 3/2004 | Van Rees et al. |
| 8,091,912 B2 | 1/2012 | Hyslop |
| 9,904,293 B1* | 2/2018 | Heap ................. G05D 1/12 |
| 10,011,211 B1 | 7/2018 | Gutierrez et al. |
| 10,450,002 B2 | 10/2019 | Williams et al. |
| 10,589,956 B1 | 3/2020 | Cruze et al. |
| 10,921,809 B2 | 2/2021 | Berg et al. |
| 11,161,575 B2 | 11/2021 | Koyano et al. |
| 2007/0073454 A1* | 3/2007 | Kaji ............... G05D 1/0206 701/21 |
| 2016/0264220 A1 | 9/2016 | Laceky |
| 2018/0050772 A1* | 2/2018 | Koyano ............. B63H 21/21 |
| 2018/0319470 A1* | 11/2018 | Williams ....... B60W 30/18036 |
| 2019/0359300 A1 | 11/2019 | Johnson et al. |
| 2021/0070407 A1* | 3/2021 | Ishii ................. B63B 79/10 |
| 2021/0229509 A1* | 7/2021 | Raeis Hosseiny ...... B60D 1/26 |
| 2021/0347449 A1* | 11/2021 | Dake ................. B63B 79/40 |

(Continued)

FOREIGN PATENT DOCUMENTS

| | | |
|---|---|---|
| JP | 2019162922 A | 9/2019 |
| WO | 2019004362 A1 | 1/2019 |

*Primary Examiner* — Abdalla A Khaled
(74) *Attorney, Agent, or Firm* — Plumsea Law Group, LLC (57) ABSTRACT

A system and method for automatically loading a boat onto a trailer include a boat trailer acting as a centralized fixed point (or leader) for commanding a moving boat (or follower). The boat trailer is equipped with systems and components to identify and track a boat in three-dimensional space; to generate motion planning information (for example, way points and vectors) that can be used by a control system of the boat to automatically guide the boat through the water and onto the boat trailer; and to detect when the process of loading the boat onto the boat trailer is complete. The boat may include one or more tags that aid in identifying and/or locating the boat in space, as well as a control system that can automatically move the boat in response to information received from the boat trailer.

20 Claims, 8 Drawing Sheets

(56) References Cited

U.S. PATENT DOCUMENTS

| | | | |
|---|---|---|---|
| 2022/0001970 A1* | 1/2022 | Hara | B63H 25/42 |
| 2022/0234490 A1* | 7/2022 | Traub | B63C 3/12 |
| 2022/0281569 A1* | 9/2022 | Traub | G05D 1/0206 |
| 2022/0291688 A1* | 9/2022 | Afman | G05D 1/0206 |
| 2022/0371503 A1* | 11/2022 | Traub | G05D 1/0206 |

* cited by examiner

AUTOMATED TRAILER LOADING SYSTEM FOR BOATS

BACKGROUND

The present disclosure generally relates to vehicles and in particular to systems for assisting with loading boats onto trailers.

Loading a boat on a trailer can be challenging for new users, especially when the weather is not ideal. High winds and currents can make it especially difficult to steer the boat onto the trailer. Loading can also be more difficult when there is poor visibility, such as at night or in foggy conditions. Improper loading can lead to damage along the hull or other parts of the boat. Concerns or stress related to a person's ability to safely maneuver a boat from the water onto a trailer may prevent that person from renting or purchasing a boat.

There is a need in the art for a system and method that addresses the shortcomings discussed above.

SUMMARY

The disclosed embodiments provide methods and systems for automatically loading a boat onto a trailer.

In some aspects, the techniques described herein relate to a boat trailer, including: a supporting frame and a plurality of wheels; a first device for receiving radio signals from a second device on a boat; a localization system for determining a position of the boat based on information from the first device; a motion planning system for generating motion planning information that can be used by a control system on the boat to automatically move the boat onto the boat trailer; and a limit switch for detecting when the boat is loaded onto the boat trailer.

In some aspects, the techniques described herein relate to a system for loading a boat onto a trailer, including: a device; a localization system for determining a position and orientation of the boat based on information from the device; a motion planning system that generates motion planning information for a control system of the boat; and a limit switch that detects when the loading has been completed.

In some aspects, the techniques described herein relate to a method of automatically loading a boat onto a trailer, including: detecting a boat and determining a relative position of the boat with respect to the trailer; generating motion planning information for a control system associated with the boat; sending the motion planning information to the control system; and detecting, using a limit switch on the trailer, that the boat has been loaded onto the trailer.

Other systems, methods, features, and advantages of the disclosure will be, or will become, apparent to one of ordinary skill in the art upon examination of the following figures and detailed description. It is intended that all such additional systems, methods, features, and advantages be included within this description and this summary, be within the scope of the disclosure, and be protected by the following claims.

BRIEF DESCRIPTION OF THE DRAWINGS

The embodiments can be better understood with reference to the following drawings and description. The components in the figures are not necessarily to scale, emphasis instead being placed upon illustrating the principles of the embodiments. Moreover, in the figures, like reference numerals designate corresponding parts throughout the different views.

DETAILED DESCRIPTION

The embodiments provide an automated loading system and associated methods for loading a boat onto a boat trailer. In the exemplary system, a boat trailer acts as a centralized fixed point (or leader) for commanding a moving boat (or follower). Specifically, the boat trailer is equipped with provisions for: (1) identifying and tracking a boat in three-dimensional space; (2) for generating motion planning information (for example, way points and vectors) that can be used by a control system of the boat to automatically guide the boat through the water and onto the boat trailer; and (3) for detecting when the process of loading the boat onto the boat trailer is complete. The boat may include one or more tags that aid the trailer-based system in identifying and/or locating the boat in space, as well as a control system that can automatically move the boat in response to information received from the boat trailer.

Using the boat trailer as the commanding system in the automated loading system allows the water current speed to be more easily calculated compared with systems that rely on the boat to gather all relevant data. In particular, in the exemplary embodiments, the water current speed can be calculated as the difference between the boat's speed in the water and the boat's speed relative to the boat trailer.

By using the trailer as the commanding system, features such as the trailer depth, the type of terrain for loading (sand vs. concrete, for example), and any tilt in the trailer can be easily detected and accounted for when generating motion planning information for the boat. Moreover, the system allows for dynamic movement and/or adjustment of the trailer to facilitate easier loading.

Figure 1:
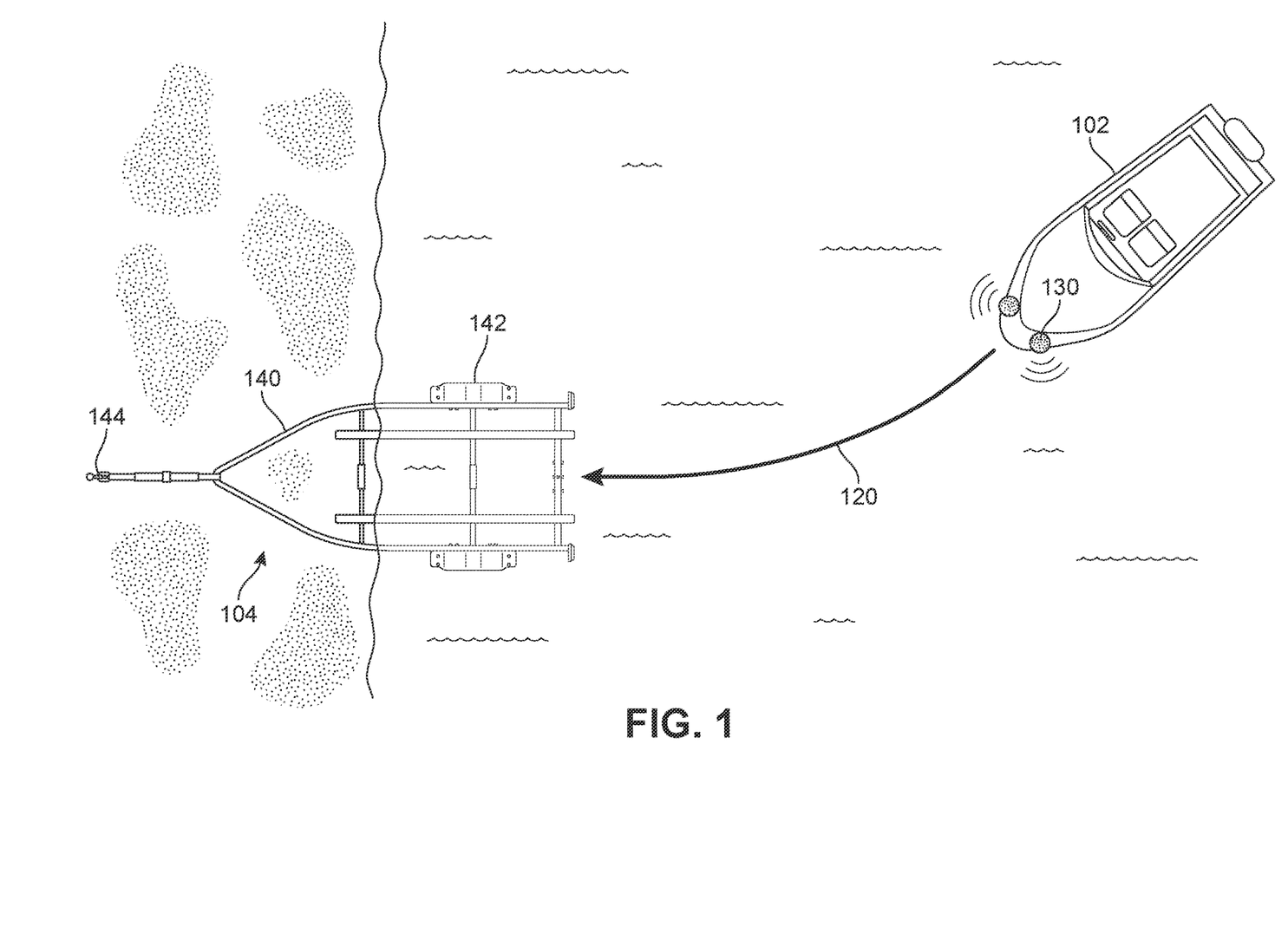
FIG. 1 is a top view of a situation where a boat is loaded onto a boat trailer, according to an embodiment.

To better understand the embodiments, FIG. 1 illustrates a top view of a situation where a boat 102 is loaded onto a boat trailer 104 (or simply "trailer 104"). As used herein, a "boat" may be any suitable type of watercraft including, but not limited to: a motorboat, a personal watercraft, a jet ski, a pontoon boat, a yacht, a sailboat, a catamaran, or any other suitable watercraft. A boat trailer, as used herein, refers to any trailer comprising a supporting frame for holding a boat, two or more wheels, and provisions for connecting the trailer to a motor vehicle that can tow the trailer, such as a ball mount. The exact configuration of the trailer, including shape and size, may depend on the type of watercraft being towed. Although not shown in FIG. 1, trailer 104 could be further attached to any suitable towing vehicle, such as a car, van, truck, or other suitable motor vehicle. In the exemplary embodiment of FIG. 1, trailer 104 includes a supporting frame 140, two wheels 142, and a trailer coupling portion 144.

As already discussed, maneuvering a boat from the water onto a trailer, especially in challenging conditions (for example, high current, high wind and/or poor visibility), may lead to problems including damage to the boat. The exemplary system provides a way to load boat 102 onto trailer 104 autonomously and with sufficient accuracy so that the boat is not damaged. Specifically, once the boat has been positioned at an identified starting location, or starting area, the exemplary system can take over and provide information for automatically moving the boat onto trailer 104. In particular, the exemplary system generates information that can be used by control systems on the boat to automatically guide the boat along a trajectory 120. In some cases, as discussed in further detail below, the information generated by the system could comprise a set of waypoints and vectors that are used by a control system of the boat to generate automated throttle and/or steering instructions.

As seen in FIG. 1, in some embodiments, boat 102 may include one or more tags 130. As used herein, the term "tag" refers to any component or device that can be used to identify and/or locate a boat within a three-dimensional (or two-dimensional) space. A tag could be an active or passive component. In one example, a tag could be a device that can transmit radio signals, which may be detected and used by other devices to determine a location of the tag. In some cases, the tag could transmit ultra-wideband (UWB) signals.

In other embodiments, rather than using tags that may be identified via radio signals, tags 130 include visual anchors. A visual anchor could comprise any visible portion of a boat that has recognizable patterns and/or colors. In some cases, a visual anchor could be a sticker or distinctly painted region on a boat. Visual anchors may be detected using one or more cameras on trailer 104.

A tag on a boat may be detected by a corresponding tag reader on a trailer. Depending on the type of tag(s) used on the boat (for example, either a radio frequency tag or a visual tag), the tag reader could comprise a radio receiver or a camera.

Tags may be located on any suitable regions of a boat. In embodiments using electronic tags, the tags may or may not be visible on the exterior of the boat. In embodiments where the tags comprise visually identifiable, the anchors may be disposed on an exterior of the boat. For example, the anchors could be disposed on a front of the boat's hull, which may be visible to any camera while the boat is oriented with the front towards the camera. In particular, the anchors could be disposed on a portion of the hull that is generally above the waterline when the boat is in the water.

Figure 2:
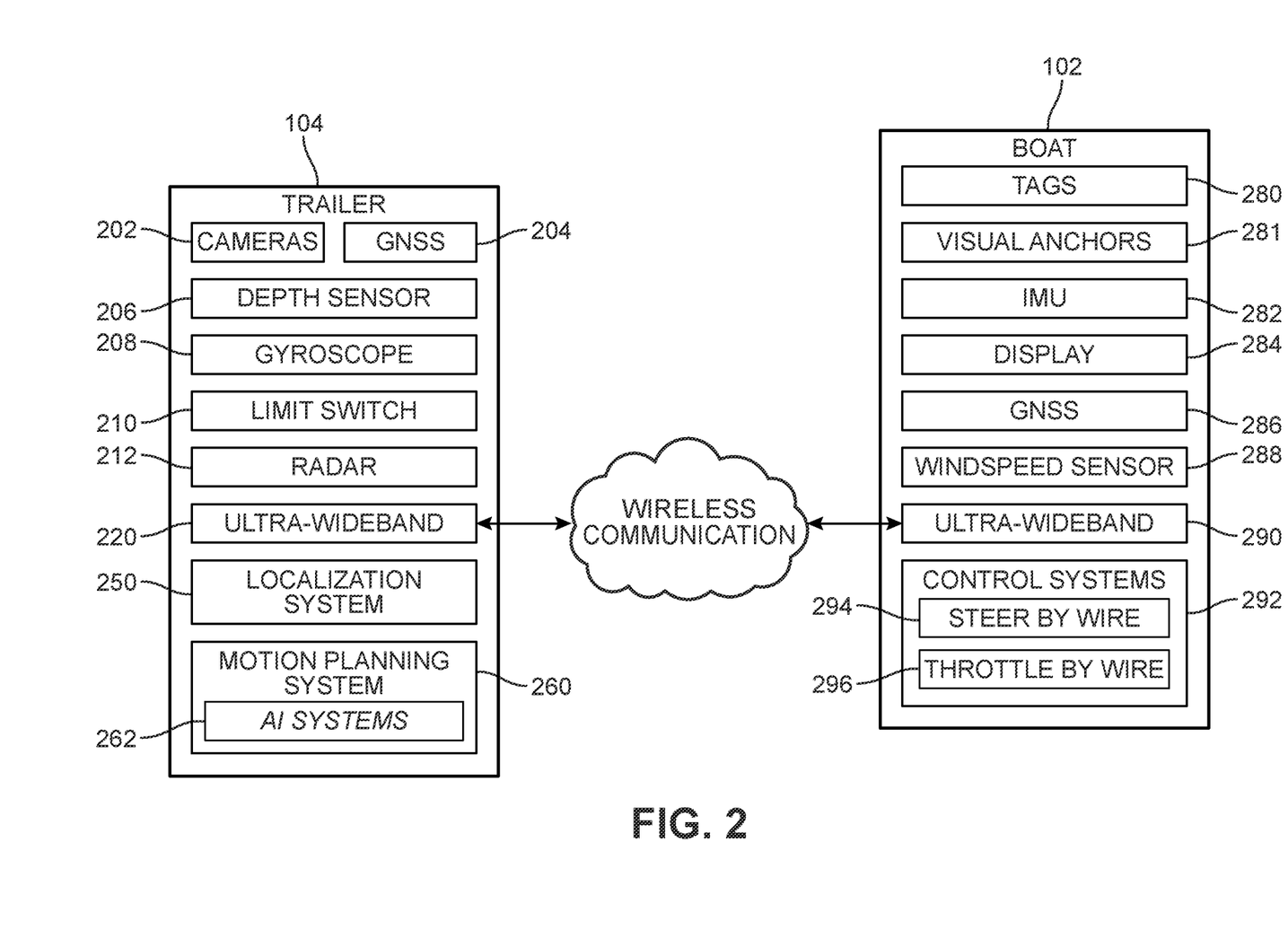
FIG. 2 is a schematic view showing some components of an exemplary automated boat loading system, according to an embodiment.

FIG. 2 is a schematic view showing some components of an exemplary automated boat loading system. As seen in FIG. 2, some components may be associated with trailer 104, while other components may be associated with boat 102.

Referring to FIG. 2, trailer 104 may comprise various components for sensing or otherwise receiving information. These include one or more cameras 202, a Global Navigation Satellite System (GNSS) component 204 (for example, a GPS receiver), a depth sensor 206, a gyroscope 208, a limit switch 210, and a radar device 212.

Cameras 202 can be positioned at any suitable locations along trailer 104 to capture images of a boat in the water when the trailer is positioned for loading. Any suitable types of cameras can be used, including cameras using charge-couple devices (CCDs) and active-pixel sensors (APSs). In some cases, cameras 202 could be used to detect one or more visual anchors on the boat to assist with localizing the boat.

Depth sensor 206 may be any suitable sensor positioned on trailer 104 to detect the depth of the trailer below the waterline when trailer 104 is positioned for loading. Gyroscope 208 may be any suitable gyroscopic sensor for detecting the angle/orientation of trailer 104. Using information from both depth sensor 206 and gyroscope 208 may allow a system to determine the depth of different portions of a trailer.

Limit switch 210 may be any suitable switch for detecting when a boat has been loaded in place on a trailer. In some cases, two or more limit switches could be used at different locations on trailer 104.

In some embodiments, radar device 212 may be used to measure information about water current speed and/or boat speed.

Trailer 104 may also include an ultra-wideband (UWB) device 220. UWB device 220 could comprise a UWB transmitter and/or receiver. UWB device 220 may be used to detect UWB signals from devices such as active UWB enabled tags on a boat. In some cases, UWB device 220 may be used to send and receive information.

Trailer 104 may also include one or more processing systems that can process sensory or other incoming information. Trailer 104 may include a localization system 250 and a motion planning system 260. Localization system 250 may comprise a suitable computing system for processing inputs from various sensors to determine the relative location and/or orientation of a boat in three-dimensional (or two-dimensional) space relative to anchors (such as UWB receiving devices). Any suitable localization algorithms could be used to determine position and/or orientation information for a boat in space. For example, any algorithms that are used to determine precise locations for nearby objects with UWB tags. Such algorithms could utilize Time of Flight information or Total Difference of Arrival information from UWB signals sent by the tags and detected at a receiver (such as UWB device 220 of trailer 104). In some embodiments, localization system 250 could utilize GNSS information, image information from a camera, and signals received via UWB, in order to determine the position of a boat relative to a trailer. In some embodiments, localization system 250 could use a two-stage approach in which coarse localization is obtained using UWB information and fine grained localization is obtained using a vision system (for example, detecting visual anchors on a boat using one or more cameras 202).

Motion planning system 260 may comprise a suitable computing system for generating motion planning instructions or motion planning information for a boat based on information from localization system 250 (as well as possibly other components). Motion planning system 260 may comprise algorithms to simulate trajectories through the water based on fluid dynamics and vehicle (boat) dynamics. Motion planning can include accounting for simulation-to-real gaps that occur between simulated movement of a boat and real-world motion of the boat in the water, as well as managing uncertainties inherited from perceptions/localizations. In some embodiments, motion planning system 260 could utilize platforms such as the Matlab Marine Systems Simulator (MSS) and the Matlab Marine Visualization Toolbox, as well as Python simulators like UTSimSea and Fluid simulator.

As used herein, the term "motion planning information" refers to information that can be used by a control system on a boat to move the boat along a desired trajectory. In some cases, motion planning information could comprise a set of waypoints. In some cases, motion planning information could comprise a set of vectors. The vectors may indicate a direction of travel and/or the intended speed of travel between two waypoints. In some cases, motion planning information comprises both waypoints and vectors that a control system can use to automatically pilot the boat along a trajectory to the trailer. In particular, the control system can use the waypoints and vectors to determine appropriate steering and throttle settings at different points in time as the boat travels to the trailer. In other cases, rather than providing waypoints and vectors, motion planning information may comprise specific throttle and steering settings that can be directly implemented by the control system.

Motion planning system 260 may utilize artificial intelligence (AI systems 262) to optimize motion planning information. As an example, motion planning system 260 could utilize suitable AI or machine learning (ML) algorithms such as decision trees, support vector machines, and neural networks, to determine optimal motion planning information for various input factors. Using AI/ML may allow motion planning system 260 to generate optimal motion planning information that not only prevents damage to the boat during loading, but also minimizes the loading time.

Boat 102 may comprise one or more radio frequency tags 280, visual tags (or visual anchors) 281, an inertial measurement unit (IMU) 282, a display 284, a GNSS component 286, and a wind speed sensor 288. Radio frequency tags 280 may be located on boat 102 and received by UWB device 220 to detect the boat and localize the boat in space. Visual tags 281 may be detected by cameras 202 on trailer 104 for detecting the boat and localizing the boat in space. IMU 282 may generate information that can be used to determine the velocity, acceleration, and/or position of boat 102. Wind speed sensor 288 may be any suitable sensor that can detect the speed and direction of wind with suitable accuracy for the purposes of modeling the movement of boat 102 through the water (using motion planning system 260). In other embodiments, wind speed sensor 288 could be located on trailer 104.

In some embodiments, boat 102 may include a separate ultra-wideband (UWB) device 290 that facilitates communication with trailer 104. In other embodiments, a single UWB enabled device may function as both a UWB tag and a wireless communication system.

Boat 102 may include one or more control systems 292. Control systems 292 could include systems that interface with manual controls (such as a steering wheel and/or throttle lever) and transmit manual controls to the motor and/or steering system of the boat. In some embodiments, control systems 292 are associated with autonomous systems that can engage in fully autonomous control of the boat for periods of time. In some cases, control systems 292 include systems for electronically controlling the steering system (steer by wire system 294) and for electronically controlling the throttle (throttle by wire system 296).

Control systems 292 may also include provisions for receiving motion planning information from trailer 104 and for converting that information into commands to steer by wire system 294 and throttle by wire system 296. For example, control systems 292 can include processors and memory that execute algorithms to convert waypoints and speed vectors received from trailer 104 to commands that can be executed by steer by wire system 294 and throttle by wire system 296.

As shown in FIG. 2, trailer 104 and boat 102 may communicate using UWB systems. For example, data gathered by one or more sensors onboard boat 102 can be sent to components of trailer 104 using UWB communication. Likewise, motion planning information generated by motion planning system 260 on trailer 104 can be sent to control systems 292 on boat 102 using UWB communication. In other embodiments, however, trailer 104 and boat 102 could communicate using any other suitable wireless communication systems and protocols. For example, components and systems of trailer 104 and of boat 102 could communicate using Bluetooth based communications, WiFi based communications, cellular communications, or other suitable wireless communications (Bluetooth is a registered trademark of the Bluetooth SIG. WiFi is a registered trademark of the Wi-Fi Alliance).

Figure 3:
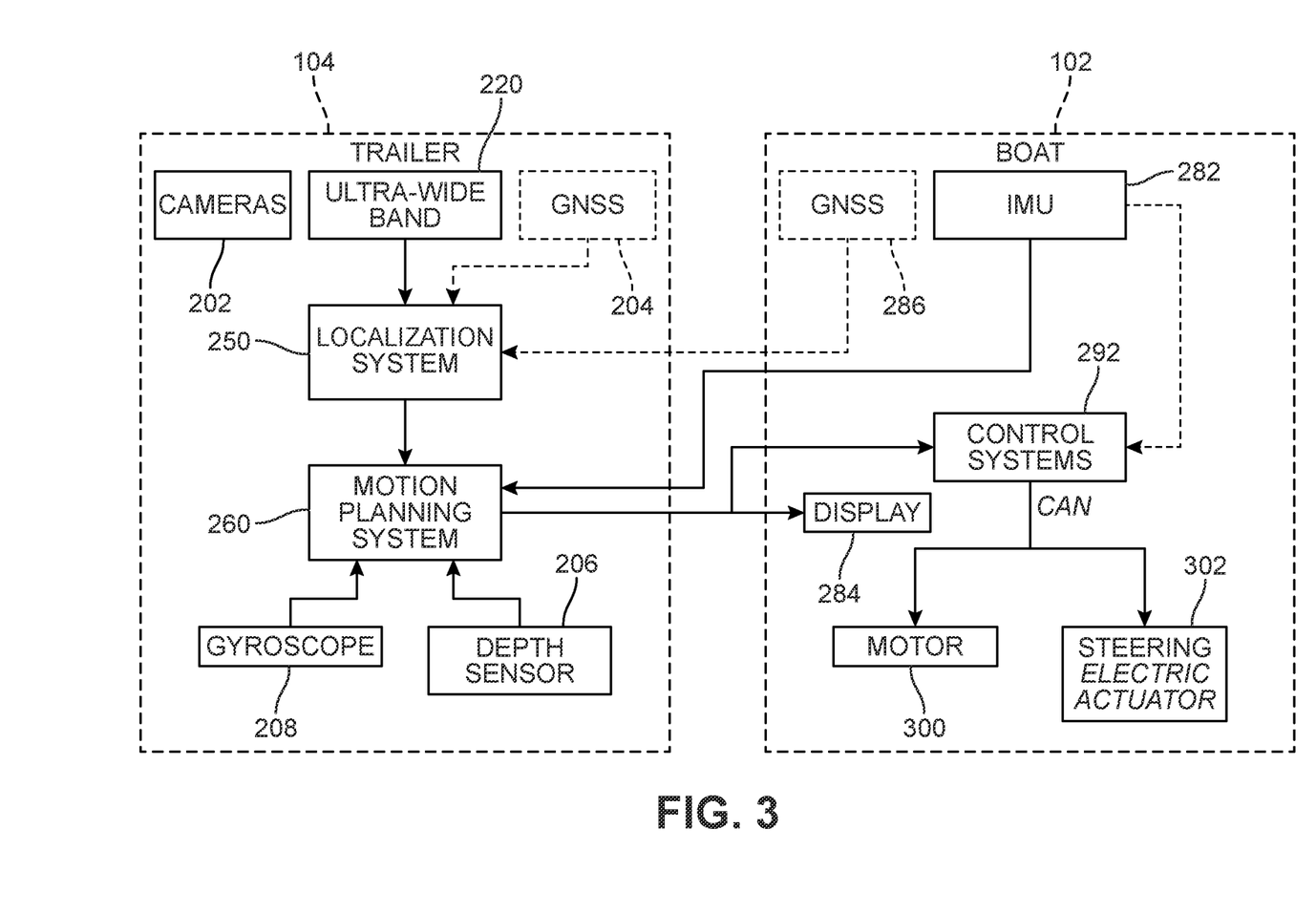
FIG. 3 is a schematic view of the flow of information through various systems aboard a boat and a trailer to facilitate automated boat loading, according to an embodiment.

FIG. 3 is a schematic view of the flow of information through various systems aboard boat 102 and trailer 104 to facilitate automated boat loading. For clarity, components and systems associated with boat 102 and with trailer 104 are separated using dotted boundary lines.

Referring to FIG. 3, information from cameras 202, UWB device 220 and IMU 282 can be received as input to localization system 250. In particular, image data from cameras 202 can be used to capture any visual anchors that provide visual identification and localization of the boat, while UWB device 220 may receive UWB signals that facilitate localization of the boat. Optionally, in some embodiments GNSS information (for example, GPS coordinates) for each of trailer 104 and boat 102 may be provided as inputs to localization system 250.

Localization system 250 processes the provided inputs and generates spatial information, such as coordinates for the boat and trailer, orientation information for the boat and trailer, and/or the relative distance between the boat and trailer. The information generated by localization system 250 may then be fed into motion planning system 260. Motion planning system 260 may use the received information to plan a trajectory for moving the boat so that it can be loaded into the trailer. In some cases, motion planning system 260 could receive information from IMU 282 on boat 102. In addition, in some cases, motion planning system 260 could receive information from wind sensors (not shown in FIG. 3) on either of boat 102 or trailer 104, and or from a radar device (not shown in FIG. 3) on the trailer or on the boat.

In some embodiments, motion planning system 260 may receive information that indicates how the trailer is oriented and/or tilted, the depth of the trailer below the water line, and/or the type of ground surface where the trailer is located (for example, sand, concrete, grass, or other types of surfaces). This information may be used to provide more precise motion planning information, since these factors can affect the ideal trajectory for loading the boat. To account for the orientation and/or tilt of the trailer, the motion planning system could receive information from a gyroscope on the trailer. To account for the depth of the trailer under the water, the motion planning system could receive information from a depth sensor on the trailer. To account for the type of terrain, the motion planning system could receive information from a camera on the trailer capable of capturing images of the ground surface, along with suitable software for classifying the ground surfaces in the images (for example, classifying the ground surface as sand or concrete). Accounting for the ground surface may be important as some kinds of surfaces will tend to give more under the weight of the trailer as the boat is being loaded onto the trailer. Knowing the type of ground surface may allow the motion planning system to adjust the motion planning information so that the boat is still loaded properly even if the trailer moves slightly during the loading process.

Motion planning system 260 uses exemplary inputs to generate motion planning information (for example, waypoints and vectors) that are sent to systems on boat 102. Motion planning information may be sent to control systems 292 on boat 102 so that the boat can be automatically moved along a desired trajectory and loaded onto the trailer. In particular, control systems 292 can send control instructions to a motor 300 of the boat, as well as to a steering electric actuator 302 of the boat, through a controller area network (CAN). In some cases, control systems 292 may also receive information from IMU 282 to help determine how the motion planning information received from motion planning system 260 should be converted into speed and steering instructions given the boat's present location, speed, and bearing.

In some embodiments, motion planning information may also be sent to display 284 on boat 102 to be visualized by an operator of the boat. For example, display 284 may show the waypoints and vectors that comprise the desired trajectory that will be implemented by control systems 292.

Figure 4:
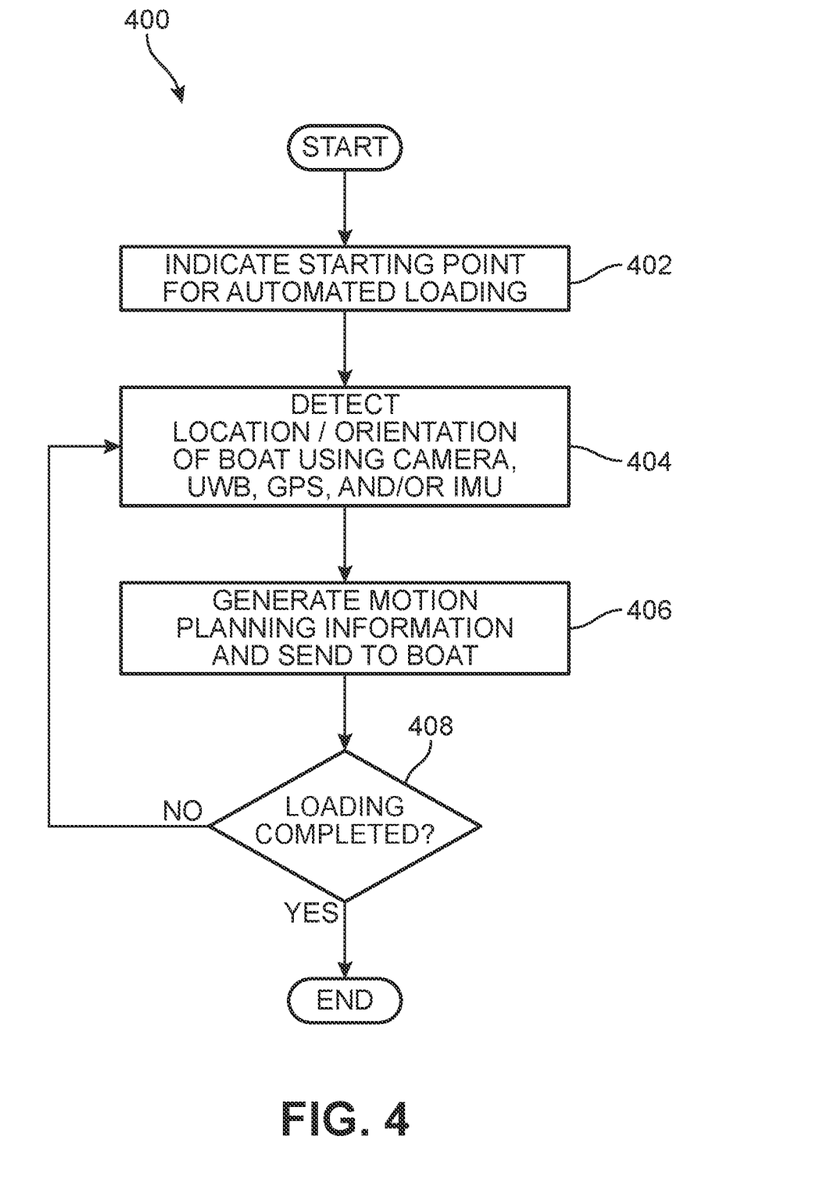
FIG. 4 is a schematic view of a process for automatically loading a boat onto a trailer, according to an embodiment.

FIG. 4 is a schematic view of a process 400 for automatically loading a boat onto a trailer using the exemplary systems described above. In process 400, one or more of the steps may be performed by components associated with a trailer, which may comprise part of, or the entirety of, a "loading system".

In step 402, a loading system may indicate a starting point for automated loading. Specifically, when a boat is being steered towards an area to be loaded onto a trailer, a system onboard the boat may communicate with a central controller at the trailer to determine where the boat should be piloted to start the automated process. In some cases, this can be done by the localization system. Specifically, the localization system may use image information gathered by the cameras to determine an area, or starting point location, where the boat should be piloted to begin the automated process. For example, the localization system may determine a starting area that is within a predetermined distance from the trailer, such that ultra-wideband communication and localization are possible. The localization system may also determine a starting orientation for the boat, to make it easier for the automated system to navigate the boat towards the trailer for loading. In some cases, visual information may be displayed at the boat for the operator, who may manually pilot the boat to the indicated area/location and point the boat in the indicated direction.

Once the boat is in the indicated area/location, the automated loading process can begin. In step 404, the loading system may detect the location and/or orientation of the boat using information from the camera, UWB information, GPS information, and/or IMU information. That is, in step 404, the localization system may perform the process of localization to determine the location and orientation of the boat in space.

In step 406, the information determined in step 404 may be used to generate motion planning information that may be sent to the boat. Specifically, the motion planning system may generate motion planning information that is then sent to the boat to be used for autonomously moving the boat and loading the boat on the trailer.

In step 408, the loading system checks for indications that the loading process has been completed. In some cases, this can include checking the states of one or more limit switches on the trailer. If the loading process is not yet complete, the loading system continues to localize the boat in space and generate appropriate motion planning information. Because of external perturbations, both localization and motion planning may be performed iteratively, as the boat may be moved off its present course by currents, winds, and other external forces. Moreover, the motion planning system may attempt to correct for these perturbations, as discussed below.

Once the loading is completed, the automated process ends.

It may be appreciated that in order to generate an appropriate trajectory for loading a boat onto a trailer, a motion planning system may consider information about the water current velocity (that is, the current speed and direction), as the water current velocity will affect the motion of the boat. In particular, a motion planning system may be configured to generate motion planning information that already accounts for the water current velocity as the boat proceeds along its planned trajectory.

Figure 5:
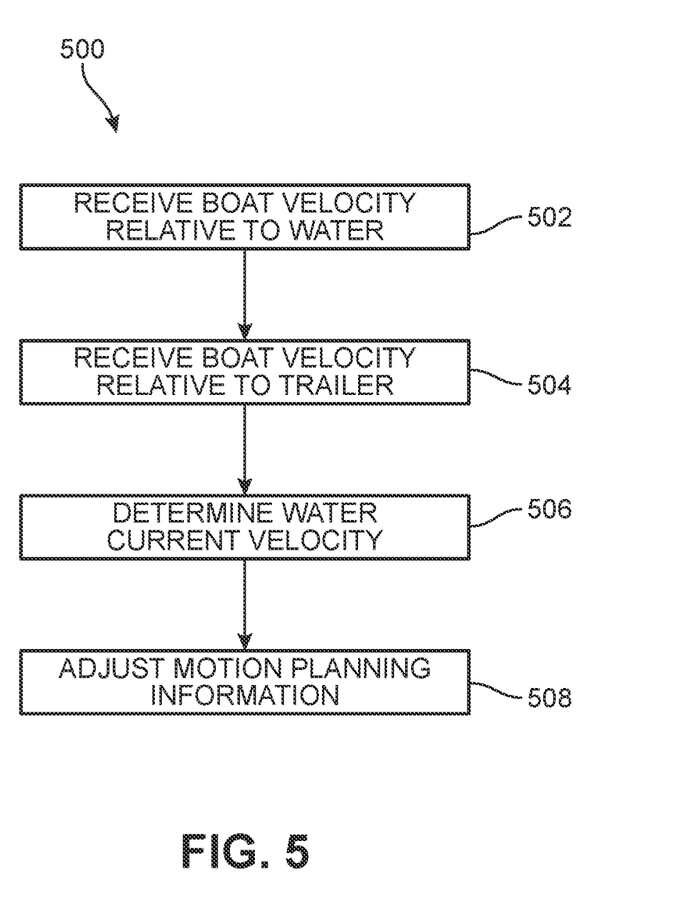
FIG. 5 is a schematic view of a process for determining the water current velocity and adjusting motion planning information for the boat, according to an embodiment.

FIG. 5 is a schematic view of a process 500 for determining the water current velocity and adjusting the motion planning information accordingly. In some cases, one or more of these steps could be performed by a processing system on the trailer, such as a motion planning system.

Starting in step 502, the motion planning system may receive the boat velocity relative to the water current velocity (for example, using information from an IMU on the boat). Next, in step 504, the motion planning system may receive the boat velocity relative to the trailer. In some cases, this information could be determined using sensors tracking the boat, such as cameras and/or UWB devices.

In step 506, the water current velocity can be determined. Specifically, in some cases, the water current velocity may be determined by calculating the difference between the boat velocity relative of the trailer (determined in step 504) and the boat velocity relative to the water (determined in step 502). The calculated water current velocity may then be used to adjust the motion planning information in step 508.

Figure 6:
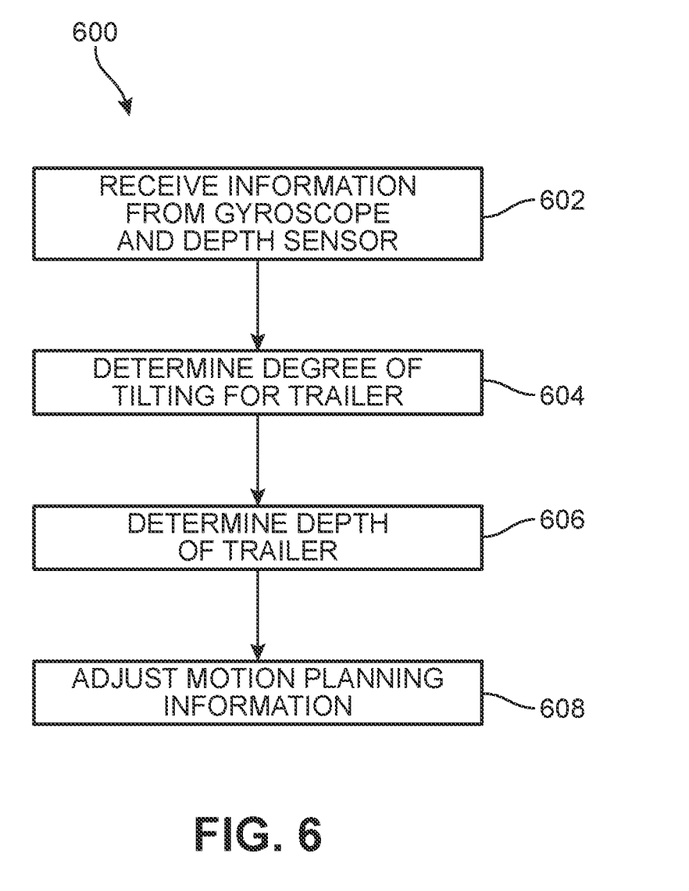
FIG. 6 is a schematic view of a process for detecting the tilt and depth of a trailer and adjusting motion planning information for the boat, according to an embodiment.

By using the boat trailer as the central controller of the automated loading system, adjustments can be easily made to the motion planning information to account for factors such as the depth and tilt (for example, left to right tilt) of the trailer. FIG. 6 is a schematic view of a process 600 for detecting the tilt and depth of the trailer and adjusting the motion planning information accordingly. In some cases, one or more of these steps could be performed by a processing system on the trailer, such as a motion planning system.

In step 602, the motion planning system can receive information from a gyroscope and depth sensor located on the trailer. In step 604, the motion planning system can determine a degree of tilting for the trailer, based on the information from the gyroscope. In step 606, the motion planning system can determine the depth of the trailer relative to the water line, based on information from a depth sensor on the trailer. In step 608, the motion planning system can adjust the motion planning information to account for the depth and any tilt in the trailer.

As previously discussed, in some embodiments a motion planning system may use artificial intelligence to predict appropriate motion planning information from complex data, rather than determining motion planning information using simulations of fluid dynamics and other computationally intensive methods. In some cases, embodiments could use pre-trained models that predict motion planning instructions directly from complex inputs.

Figure 7:
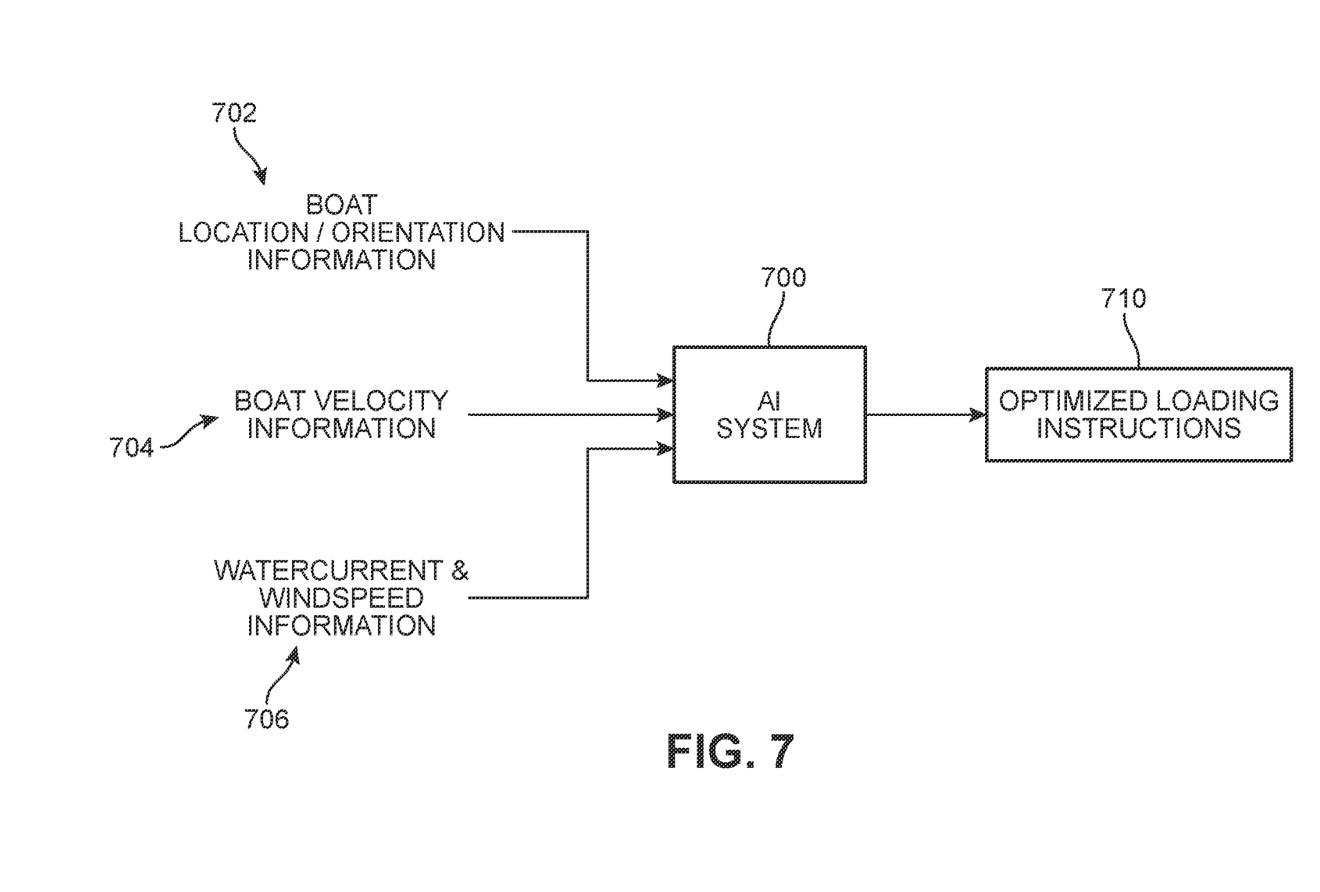
FIG. 7 is a schematic view showing an artificial intelligence (AI) system that can provide optimized loading instructions, according to an embodiment.

FIG. 7 is a schematic view showing an artificial intelligence (AI) system 700 that can provide optimized loading instructions 710 (including motion planning information) based on various complex inputs. These inputs can include boat location/orientation information (first inputs 702), boat velocity information (second inputs 704) and water current and/or windspeed information (third inputs 706).

AI system 700 can comprise any suitable models for predicting optimized loading instructions, including optimized motion planning information. In some embodiments, AI system 700 may comprise one or more decision trees. In other embodiments, AI system 700 could comprise one or more neural networks. In some embodiments, AI system 700 may use a recurrent neural network to predict motion planning information using the provided inputs.

In other embodiments, one or more processing systems could be disposed in a towing vehicle, rather than in the trailer itself. For example, embodiments could utilize existing computers inside cars and trucks for processing information from sensors and other devices installed on a trailer.

Figure 8:
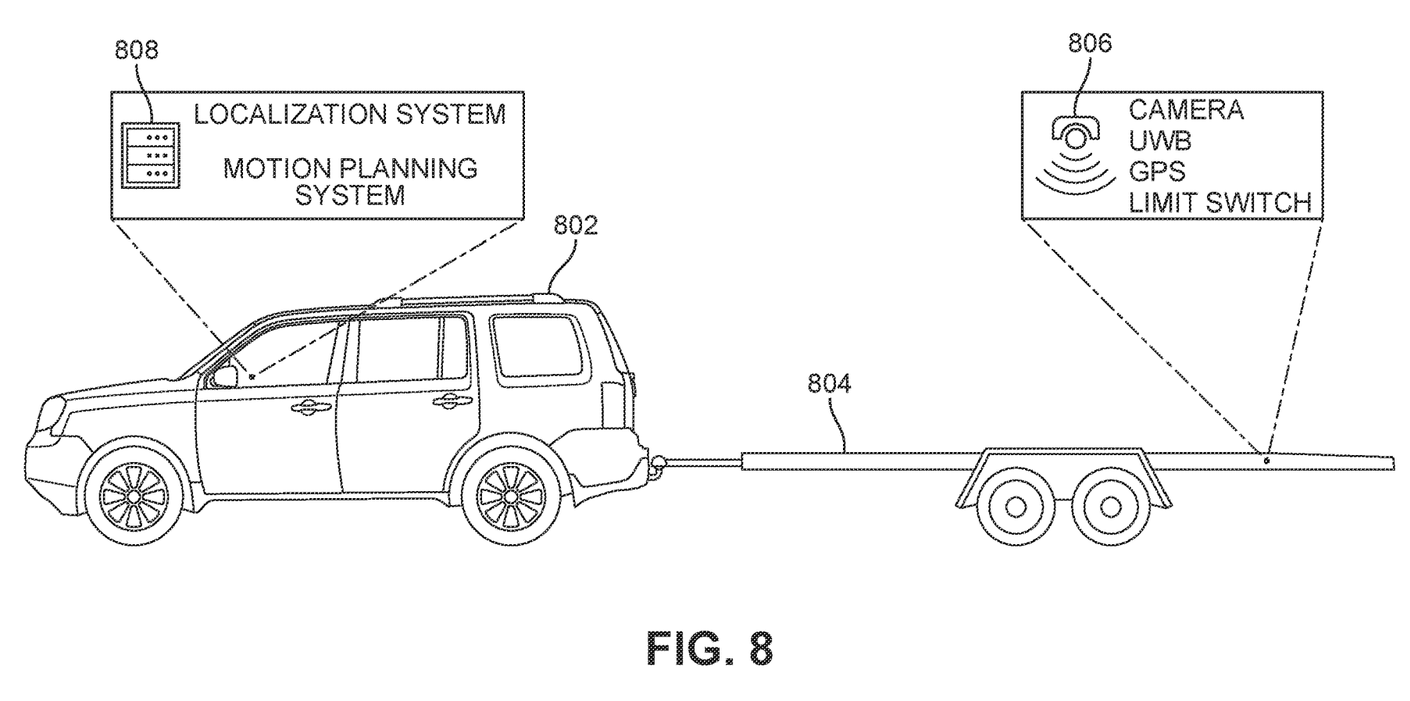
FIG. 8 is a schematic view of another embodiment of an architecture for an automated boat loading system.

FIG. 8 is a schematic view of another embodiment of an architecture for an automated boat loading system. In this embodiment, sensory and communication devices 806 are located on a trailer 804. These could include, for example, a camera, a UWB device, a GPS device, and a limit switch. Data from these sensors/devices are passed to processing systems 808 located within a motor vehicle 802. In particular, a localization system and a motion planning system may be stored in the memory of, and run on processors of, a computing system installed within motor vehicle 802. Communication between components in the trailer and components in the vehicle could be facilitated using any suitable wireless communication systems. This configuration not only provides efficiencies in utilizing existing computing infrastructure within the vehicle, but also limits the degree to which computing components are exposed to water, wind, and other elements.

In some embodiments, an automated boat loading system could include provisions for sending instructions to a towing vehicle and/or to a trailer operator to change the location, orientation (including left to right tilt and/or angle of incline along the loading direction), and/or depth of the trailer (relative to the water) in order to help with loading. For example, a system could determine, using one or more of the sensing components described above, that automated loading will be enhanced by placing the trailer at a slightly greater (or shallower) depth. As another example, the system could determine that the trailer is located on sand and inform the towing vehicle and/or trailer operator that automated loading of the boat would be improved if the trailer were located on asphalt or packed dirt. Information related to adjustments in the location, orientation, and/or depth of the trailer could be communicated to a towing vehicle and/or an operator of the trailer via any suitable communication system (including sending messages to an operator's phone or to a cockpit system in the towing vehicle). Once the location, orientation, and/or depth of the trailer has been adjusted, the system can continue automatically controlling the boat to load it onto the trailer according to the above methods. In embodiments where a trailer is towed by an automated vehicle, the automated boat loading system could send instructions to have the towing vehicle automatically reposition the trailer.

It may be appreciated that in the exemplary embodiments any processing systems, sensors, or other electronic devices and components may be configured with suitable processors and memory. The memory may comprise a non-transient computer readable medium storing instructions that may be executed by the processors.

The foregoing disclosure of the embodiments has been presented for purposes of illustration and description. It is not intended to be exhaustive or to limit the embodiments to the precise forms disclosed. Many variations and modifications of the embodiments described herein will be apparent to one of ordinary skill in the art in light of the above disclosure.

While various embodiments have been described, the description is intended to be exemplary, rather than limiting, and it will be apparent to those of ordinary skill in the art that many more embodiments and implementations are possible that are within the scope of the embodiments. Any feature of any embodiment may be used in combination with or substituted for any other feature or element in any other embodiment unless specifically restricted. Accordingly, the embodiments are not to be restricted except in light of the attached claims and their equivalents. Also, various modifications and changes may be made within the scope of the attached claims.

Further, in describing representative embodiments, the specification may have presented a method and/or process as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process should not be limited to the performance of their steps in the order written, and one skilled in the art can readily appreciate that the sequences may be varied and still remain within the spirit and scope of the present embodiments.

The invention claimed is:

1. An automated boat trailer loading system, comprising:
  a boat, the boat further comprising:
    a first device for generating radio signals; and
    a control system comprising a first processor for controlling movement of the boat in water;
  a boat trailer, the boat trailer further comprising:
    a supporting frame and a plurality of wheels;
    a second device for receiving radio signals from the first device on the boat; and
    a computing system comprising a second processor disposed in the boat trailer;
  wherein the computing system disposed in the boat trailer is configured to:
    receive information from the second device and process the information to determine a position of the boat relative to the boat trailer;
    generate motion planning information for the boat using the position of the boat relative to the boat trailer;
    send the motion planning information to the control system of the boat; and
  wherein the control system of the boat controls the boat based on the motion planning information.

2. The automated boat trailer loading system according to claim 1, wherein the first device and the second device are ultrawideband devices.

3. The automated boat trailer loading system according to claim 1, wherein the boat trailer further includes a camera, and wherein images from the camera are used to determine the position of the boat relative to the boat trailer.

4. The automated boat trailer loading system according to claim 1, wherein the control system uses at least one of steer-by-wire or throttle-by-wire to control the boat using the motion planning information.

5. The automated boat trailer loading system according to claim 1, wherein the motion planning information includes one or more waypoints.

6. The automated boat trailer loading system according to claim 1, wherein the boat trailer further comprises a limit switch for detecting when the boat is loaded onto the boat trailer.

7. A system, comprising:
a control system comprising a first processor for controlling movement of a boat;
a boat trailer, the boat trailer further comprising:
a supporting frame and a plurality of wheels;
at least one sensor;
a communication device for communicating with the control system; and
a computing system comprising a second processor disposed on the boat trailer;
wherein the computing system disposed in the boat trailer is configured to:
receive, at the at least one sensor, information associated with the boat and process the information to determine a position of the boat relative to the boat trailer;
generate motion planning information for the boat; and
send, using the communication device, the motion planning information to the control system;
wherein the control system controls the boat based on the motion planning information generated by the computing system on the boat trailer.

8. The system according to claim 7, wherein the at least one sensor comprises an ultra-wideband device for detecting ultra-wideband signals from an ultrawideband tag on the boat.

9. The system according to claim 7, wherein the at least one sensor is a camera and wherein the camera detects visual anchors on the boat.

10. The system according to claim 7, wherein the computing system receives windspeed information and generates the motion planning information using the windspeed information.

11. The system according to claim 7, wherein the computing system receives orientation information for the boat trailer and generates the motion planning information using the orientation information.

12. The system according to claim 7, wherein the boat trailer further includes a limit switch that detects when the boat has been loaded onto the boat trailer.

13. The system according to claim 7, wherein the computing system receives information about a depth of the boat trailer below a water line and generates the motion planning information using the information about the depth of the boat trailer below the water line.

14. A method of automatically loading a boat onto a boat trailer, comprising:
receiving, at a computing system comprising a first processor disposed in the boat trailer, information associated with a location of the boat relative to the boat trailer and determining, from the received information, a relative position of the boat with respect to the trailer;
generating, using the computing system disposed in the boat trailer, motion planning information for a control system comprising a second processor onboard of the boat;
sending, using the computing system disposed in the boat trailer, the motion planning information to the control system;
controlling the boat, using the control system, based on the received motion planning information; and
detecting, using a limit switch on the boat trailer, that the boat has been loaded onto the boat trailer.

15. The method according to claim 14, wherein receiving the information includes receiving images of the boat from a camera on the boat trailer.

16. The method according to claim 14, wherein receiving the information includes receiving radio signals at an ultra-wideband device on the boat trailer.

17. The method according to claim 14, wherein the method further includes receiving data from an inertial measurement unit on the boat and wherein generating the motion planning information includes using the received data from the inertial measurement unit.

18. The method according to claim 14, wherein the method further includes receiving data from a depth sensor on the boat trailer and wherein generating the motion planning information includes using the received data from the depth sensor.

19. The method according to claim 14, wherein the method further includes receiving data from a gyroscope on the boat trailer and wherein generating the motion planning information includes using the received data from the gyroscope.

20. The method according to claim 14, wherein determining the relative position of the boat with respect to the boat trailer includes analyzing images of the boat from a camera on the boat trailer and analyzing ultra-wideband signals received at an ultra-wideband receiver on the boat trailer.

* * * * *